United States Patent
Liu et al.

(10) Patent No.: US 6,935,777 B2
(45) Date of Patent: Aug. 30, 2005

(54) ELECTRONIC THERMOMETER WITH A DIRECTIONALLY ADJUSTABLE LCD DISPLAY

(75) Inventors: Pei-Hsiung Liu, Chi Pei (TW); Chih-Wei Hsieh, Chi Pei (TW)

(73) Assignee: Actherm Inc., Hsinchu Hsien (TW)

( * ) Notice: Subject to any disclaimer, the term of this patent is extended or adjusted under 35 U.S.C. 154(b) by 0 days.

(21) Appl. No.: 10/731,122

(22) Filed: Dec. 10, 2003

(65) Prior Publication Data

US 2004/0125854 A1 Jul. 1, 2004

(30) Foreign Application Priority Data

Dec. 31, 2002 (TW) .......................................... 91137986

(51) Int. Cl.⁷ ................................................ G01K 1/06
(52) U.S. Cl. ........................ 374/208; 374/170; 345/659
(58) Field of Search ................................. 374/208, 170; 200/61.45–61.52; 345/659; 340/691.6, 691.1; 702/130, 150

(56) References Cited

U.S. PATENT DOCUMENTS

| | | | | |
|---|---|---|---|---|
| 4,099,040 A | * | 7/1978 | Bitko | 200/220 |
| 4,135,067 A | * | 1/1979 | Bitko | 200/61.52 |
| 5,136,126 A | * | 8/1992 | Blair | 200/61.52 |
| 5,256,839 A | * | 10/1993 | Gallagher | 200/61.52 |
| 5,638,061 A | * | 6/1997 | Levin et al. | 341/20 |
| 5,696,529 A | * | 12/1997 | Evanicky et al. | 345/659 |
| 5,989,091 A | * | 11/1999 | Rodgers | 446/153 |
| 6,087,936 A | * | 7/2000 | Woods | 340/566 |
| 6,198,059 B1 | * | 3/2001 | Jou | 200/61.52 |
| 6,669,362 B1 | * | 12/2003 | Lin et al. | 374/121 |
| 2003/0012360 A1 | * | 1/2003 | Kim | 379/355.01 |
| 2004/0080468 A1 | * | 4/2004 | Wakefield | 345/55 |
| 2004/0084290 A1 | * | 5/2004 | Higgins et al. | 200/61.52 |

* cited by examiner

Primary Examiner—Gail Verbitsky
(74) Attorney, Agent, or Firm—Leong C. Lei (57) ABSTRACT

An electronic thermometer with a directionally adjustable LCD display is disclosed. The thermometer includes a control circuit and a display wherein the display is provided with identifiable signals capable of identifying characters and/or symbols in multiple directions, characterized in that the thermometer is provided with a direction sensing element such that the thermometer, under normal operating direction, is in an upright position facing the user, and if the thermometer is reversed, the direction sensing element due to the gravity will produce a directional signal and the control circuit of the thermometer receives the signal which immediately outputs to the display device to produce an upright display signal to the user whereby the display shows upright characters and/or symbols in multiple directions. As a consequence, the electronic thermometer can adjust to provide an upright display regardless of whether the user uses the left hand or right hand to hold the thermometer.

2 Claims, 16 Drawing Sheets

(prior art)

FIG. 16B

(prior art)

FIG. 17 (prior art)

ELECTRONIC THERMOMETER WITH A DIRECTIONALLY ADJUSTABLE LCD DISPLAY

BACKGROUND OF THE INVENTION (a) Technical Field of the Invention

The present invention relates to an electronic thermometer, and in particular, to an electronic thermometer which can adjust to provide an upright display regardless of whether the user uses the left hand or right hand to hold the thermometer.

(b) Description of the Prior Art

Before the invention of electronic thermometers, mercury thermometers were widely used for measuring body temperature. Mercury will expand when subject to heat and contract when subject to cold. When in measuring, the mercury in the measuring probe will expand so that the mercury will go into a capillary tube made of glass, so enabling a user to read the calibration on the exterior of the tube. In recent years, because of the serious danger of mercury pollution to human health, an electronic thermometer has been developed, and has gradually replaced the mercury thermometer.

Figure 14:
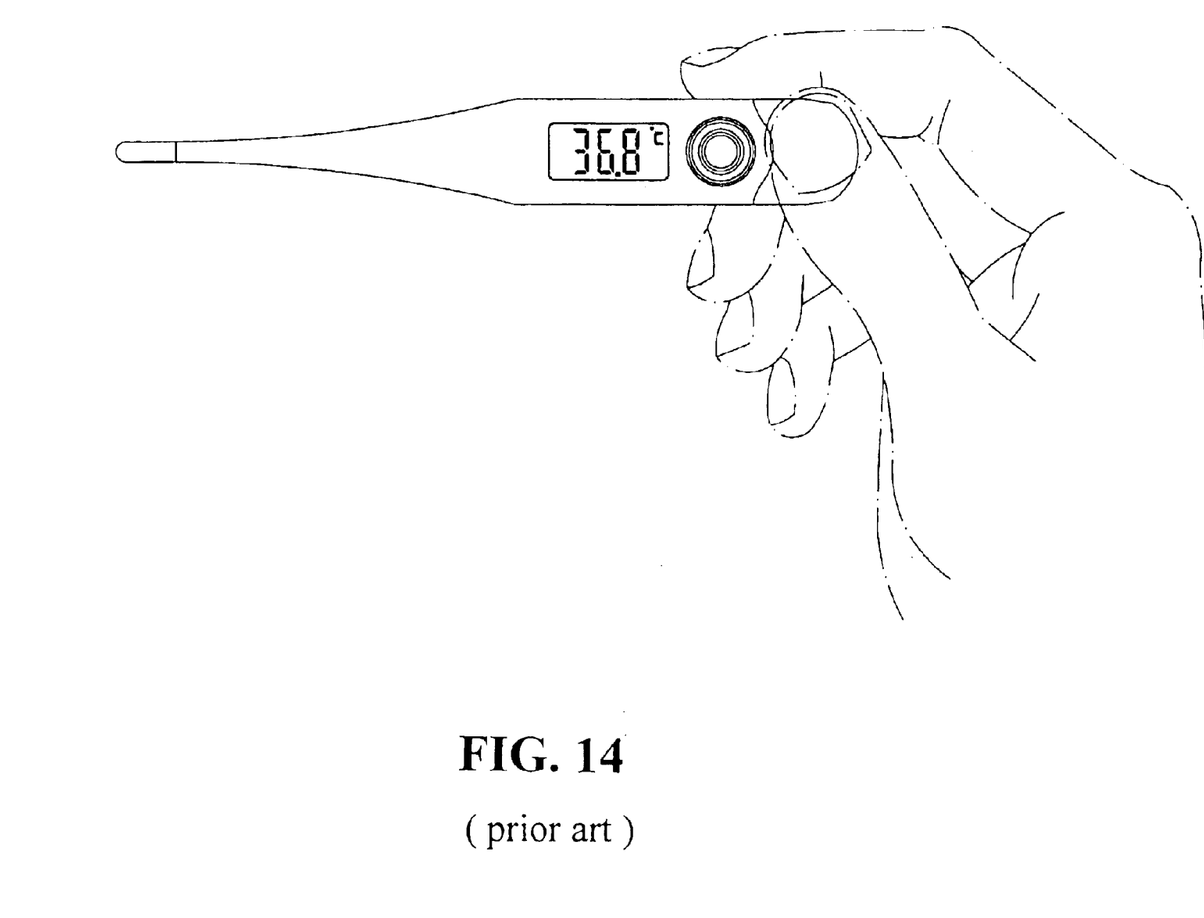
FIG. 14 is a schematic view of a conventional thermometer held with the right hand.
Figure 15:
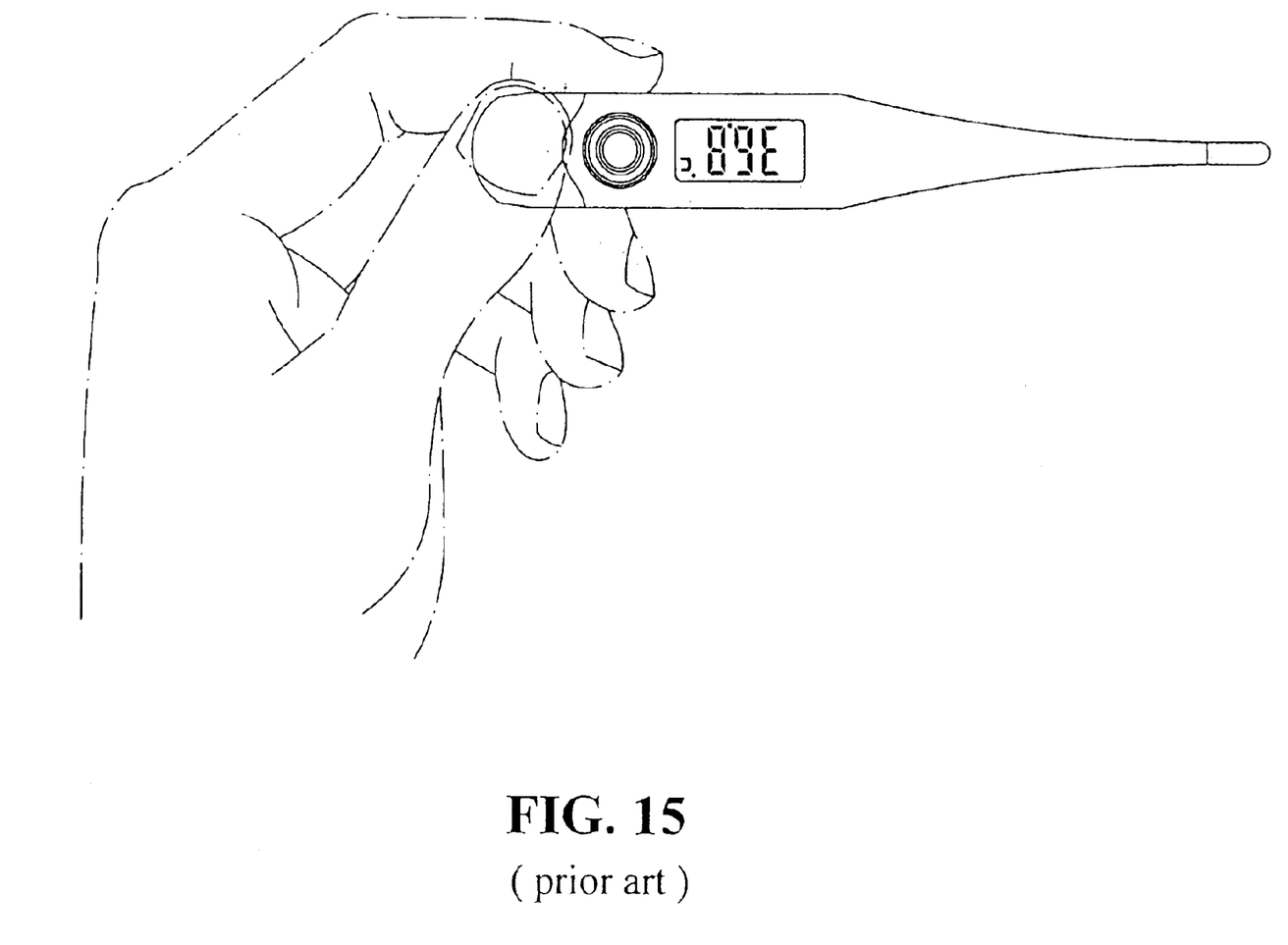
FIG. 15 is a schematic view of a conventional thermometer held with the left hand.
Figure 16A:
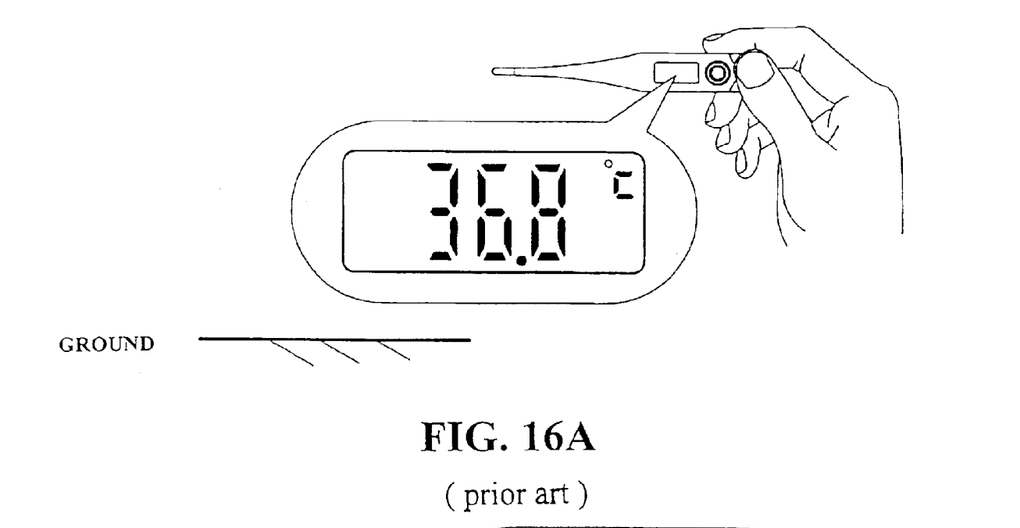
FIGS. 16A and 16B show the identifiable signals on the display device of a conventional electronic thermometer.
Figure 16B:
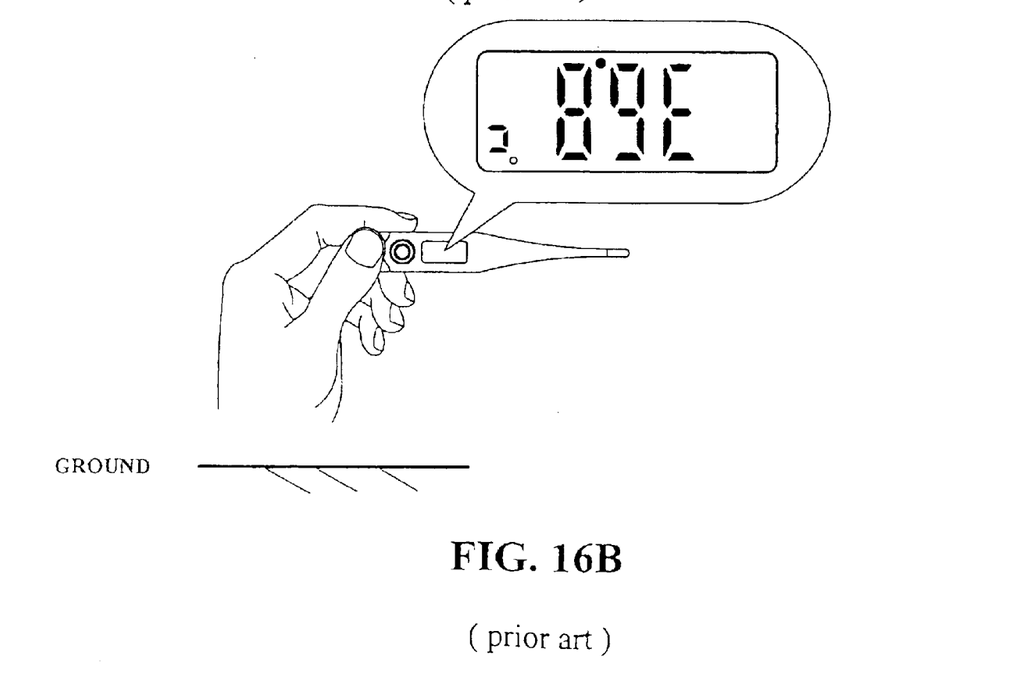

Referring to FIG. 14, the conventional electronic thermometer generally has an LCD to show the measured temperature. However, when the thermometer is turned upside down, the reading is also upside down and is not the user to read. It is generally only readable for the right-handed user. Using the left hand to use the thermometer will cause the reading to be upside down (see FIG. 15), making it difficult to read (see FIGS. 16A and 16B). Further, if the user holds the thermometer using the right hand when measuring the temperature, the reading will be upside down for another person attempting to read the temperature. Moreover, a patient has to move his body to read at the same direction of the doctor or nurse, or the thermometer must be given to the nurse so that the nurse can read the reading of the thermometer in an upright position.

Figure 17:
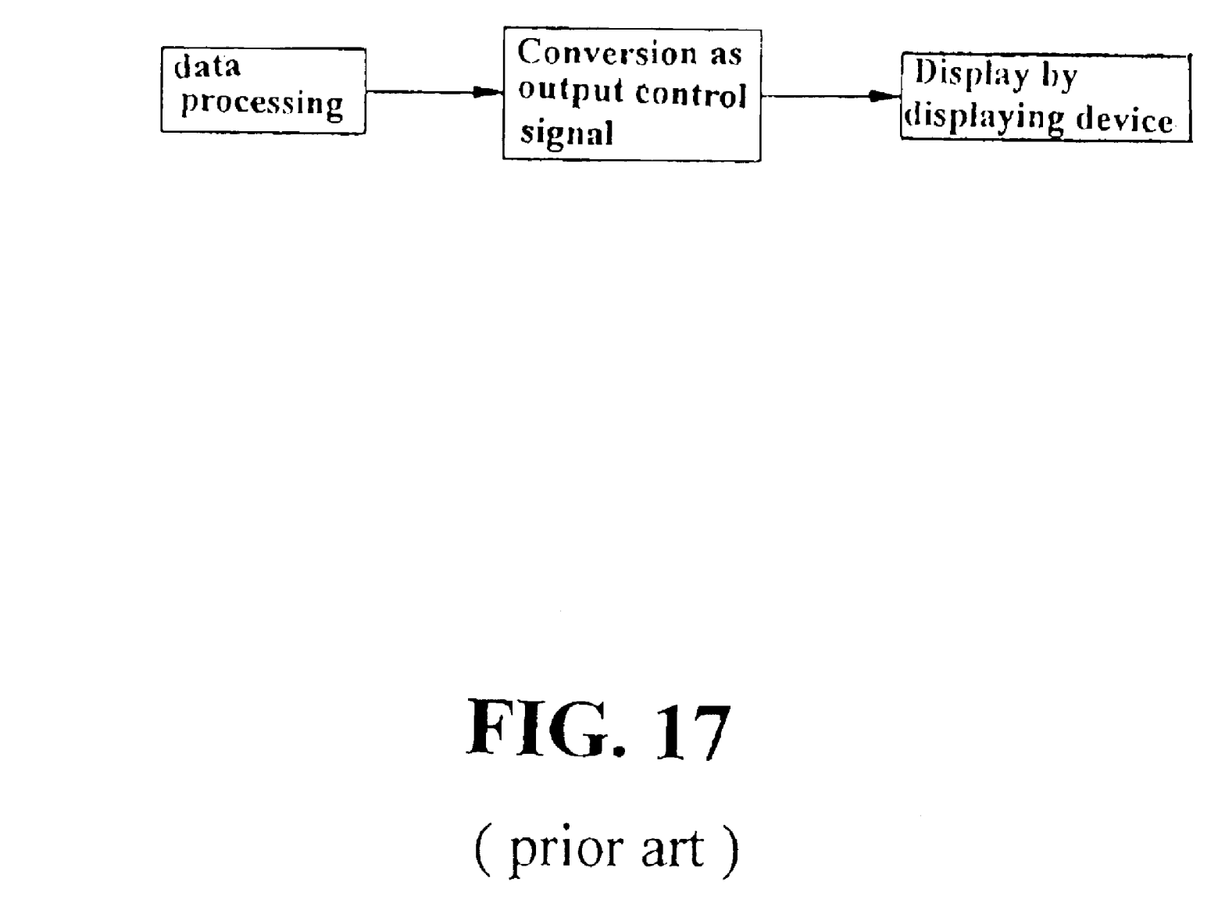
FIG. 17 is a sensing flowchart of a conventional display device.

As shown in FIG. 17, after the conventional thermometer is used for measuring temperature, the signal is directly converted into output control signal by means of data processing which will then show the temperature in the display. However, when the thermometer is turned upside down, the reading is also upside down and is not convenient for a user to read.

Thus, it is an object of the present invention to provide an electronic thermometer in which the temperature reading will automatically adjust to the different direction in which the thermometer is held, so that the temperature can be read with ease even if the thermometer is turned upside down. In this way, left and right handed users of the thermometer can read the temperature, and the person receiving the thermometer from the user, without having to move the thermometer or adjust their physical position, can carry out such readings.

SUMMARY OF THE INVENTION

Accordingly, it is an object of the present invention to provide an electronic thermometer which can adjust to provide an upright display in different directions. The electronic thermometer is provided with an identifiable signal which can identify characters and/or symbols at least capable of displaying temperature in multiple directions. Furthermore, the electronic thermometer is provided with a direction sensing element or an externally connected button switch. Under normal operation, the thermometer is in an upright position facing the user, and if the thermometer is reversed, the direction sensing element will produce a directional signal due to gravity. Then, the measuring circuit of the thermometer receives the signal which immediately outputs to the display to produce an upright signal (such as the correct temperature value) to the user, thereby displaying an identifiable signal to the user no matter whether the user uses the left hand or right hand to hold the thermometer.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
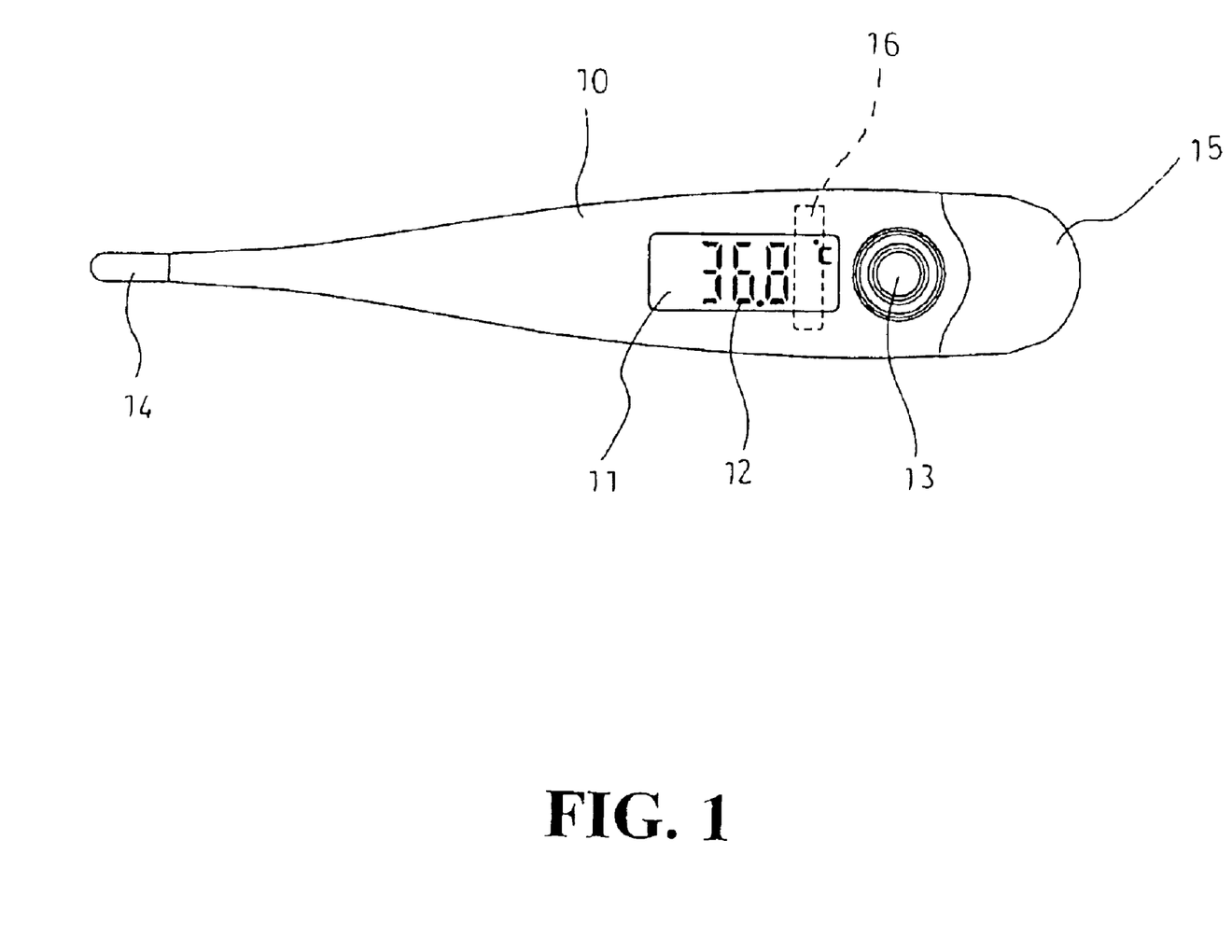
FIG. 1 is a perspective view of the present invention.

Referring to FIG. 1, the electronic thermometer according to the present invention comprises a body portion 10 in which are mounted a basic circuit, wires, and batteries. The surface of the body 10 is provided with an LCD display 11 and a switch 13, wherein the display 11 is provided with identifiable signals 12. The switch 13 is used for controlling the thermometer. The front portion of the body 10 is provided with a sensing probe 14 for detecting temperature. The rear portion of the body 10 is provided with a rear cover 15.

Figure 4A:
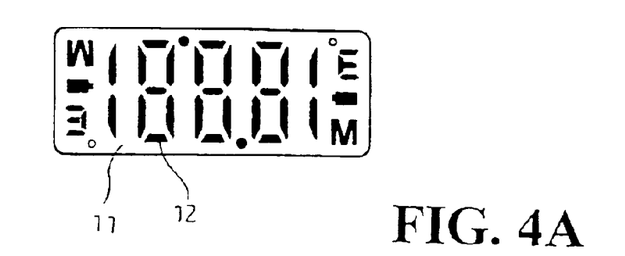
FIGS. 4A, 4B, 4C schematically show the identifiable signal at each status in accordance with the present invention.
Figure 5:
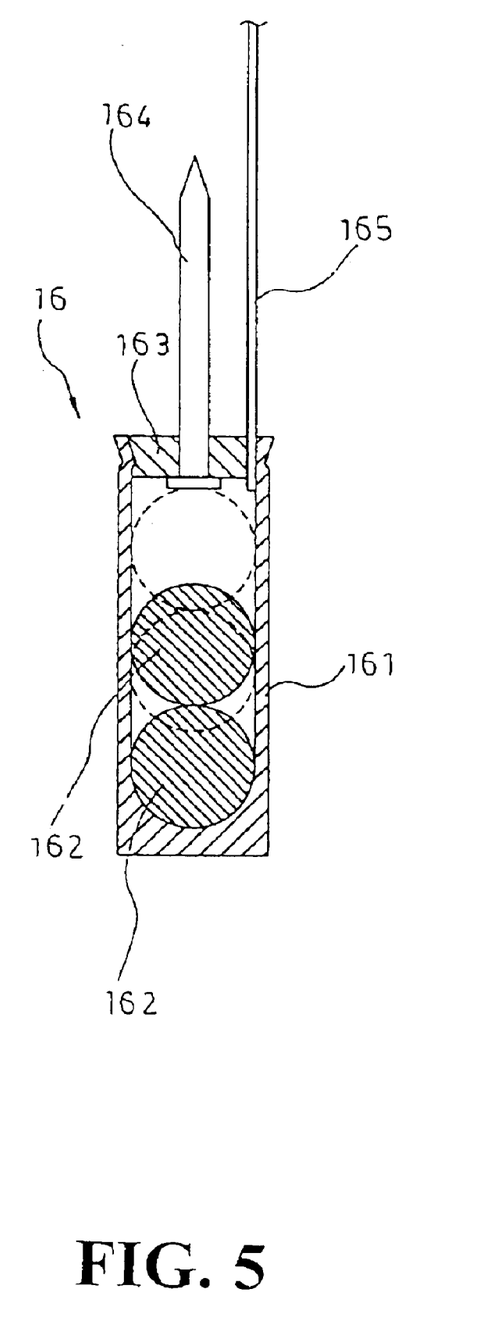
FIG. 5 is a schematic view showing the structure of the direction sensing element.

The display 11 of the electronic thermometer according to the present invention is provided with identifiable signals with multiple direction characters and/or symbols (also referring to FIG. 4A) which at least can display temperature readings. The middle section of the body 10 is a direction sensing element 16 (for example, a roller (or ball) vibration switch). The structure of the sensing element 16 is well known in the art and a roller (ball) vibration switch is described here as an example only. The roller (ball) vibration switch can be replaced by any other mechanism which has the same function. The direction sensing element 16 is provided with a sleeve 161 having two gold plated rollers 162, and the opening end of the sleeve 161 is provided with an insulation plug block 163 having an outer diameter which is equal to the inner diameter of the sleeve 161. The center of the block 163 is provided with a gold plated pin 164. A metallic conductive wire 165 is provided between the block 163 and the inner wall of the sleeve 161. Under normal situation, without inverting the thermometer, the two gold plated rollers 162 are positioned on the bottom of the sleeve 161, which are in contact with the inner wall of the sleeve 161 but not in contact with the gold plated pin 164, so that the gold plated pin 164 is not connected to the metallic conductive wire 165 and no signal is produced. When the thermometer is inverted, the two gold plated rollers 162 (due to gravity) will fall towards the gold plated pin 164 (shown in dotted lines of FIG. 5). At this instance, the two plated rollers 162 will get in touch with the inner wall of the sleeve 161 and the gold plated pin 164, such that the gold plated pin 164 is electrically connected to the conductive wire 165 thereby producing a direction signal.

Figure 2:
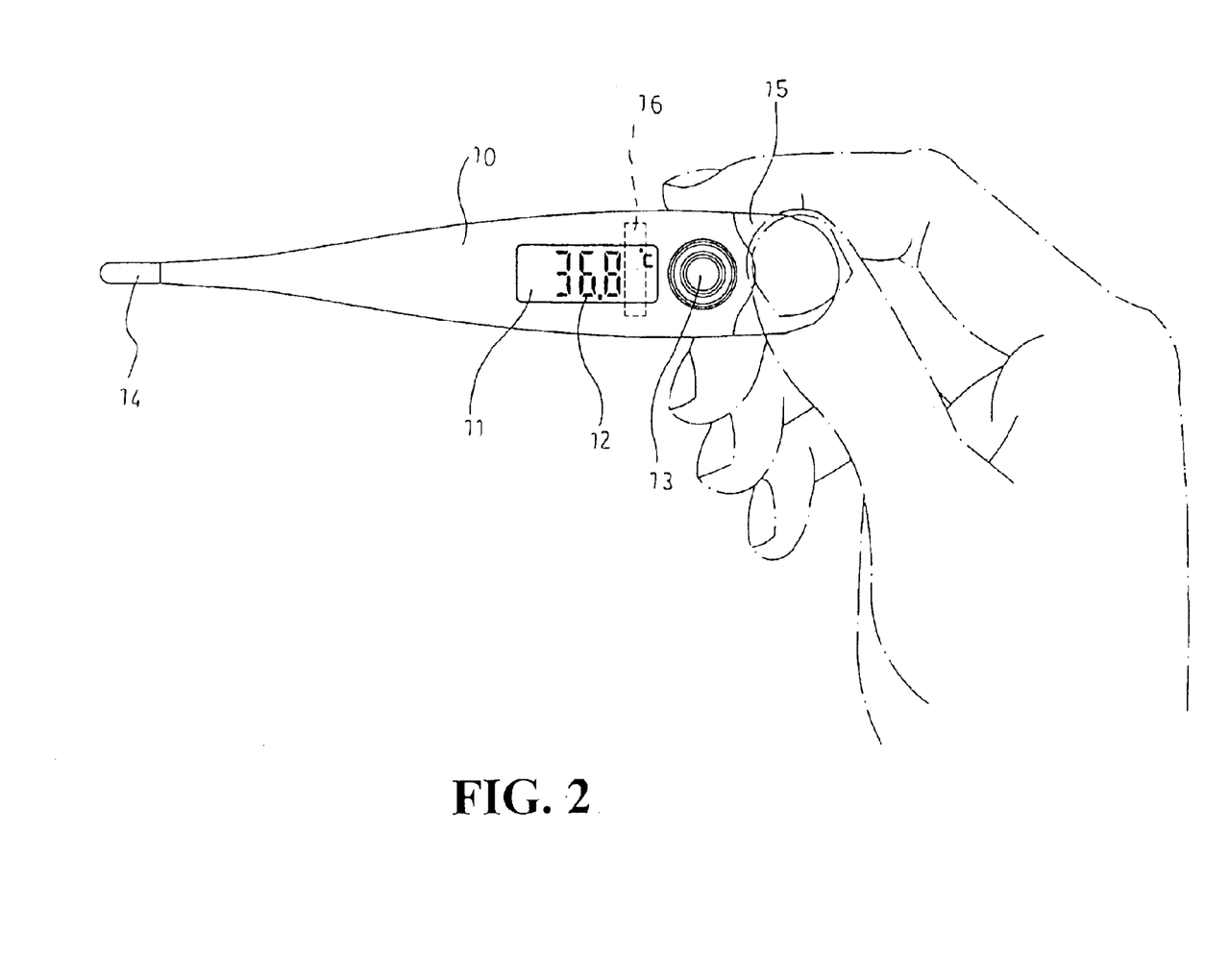
FIG. 2 is a schematic view showing the holding of the thermometer with the right hand.
Figure 4B:
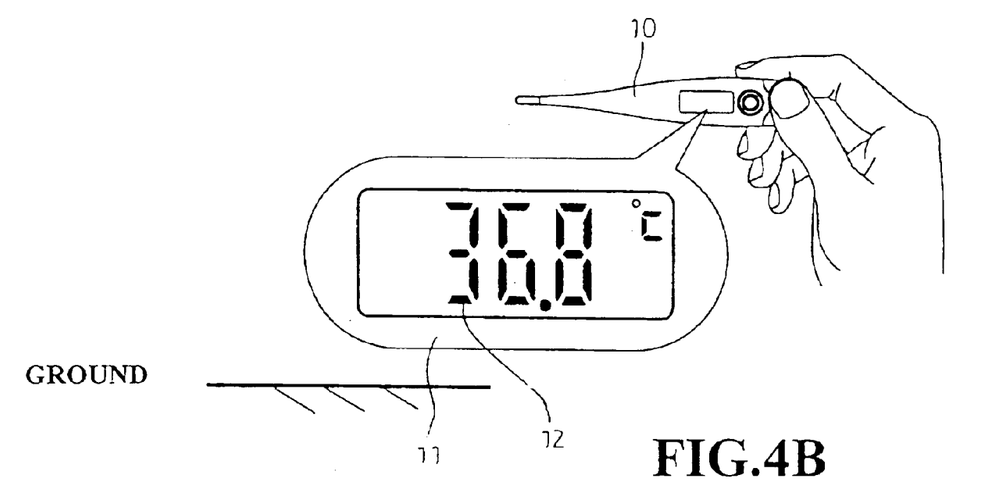

Referring to FIGS. 2 and 4B, when the thermometer is held by the right hand in normal operation, the identifiable signal 12 on the display 11 facing the user is in an upright position (the identifiable signal shown in FIG. 4B is a temperature reading) and so the user can see the reading in an upright position.

Figure 3:
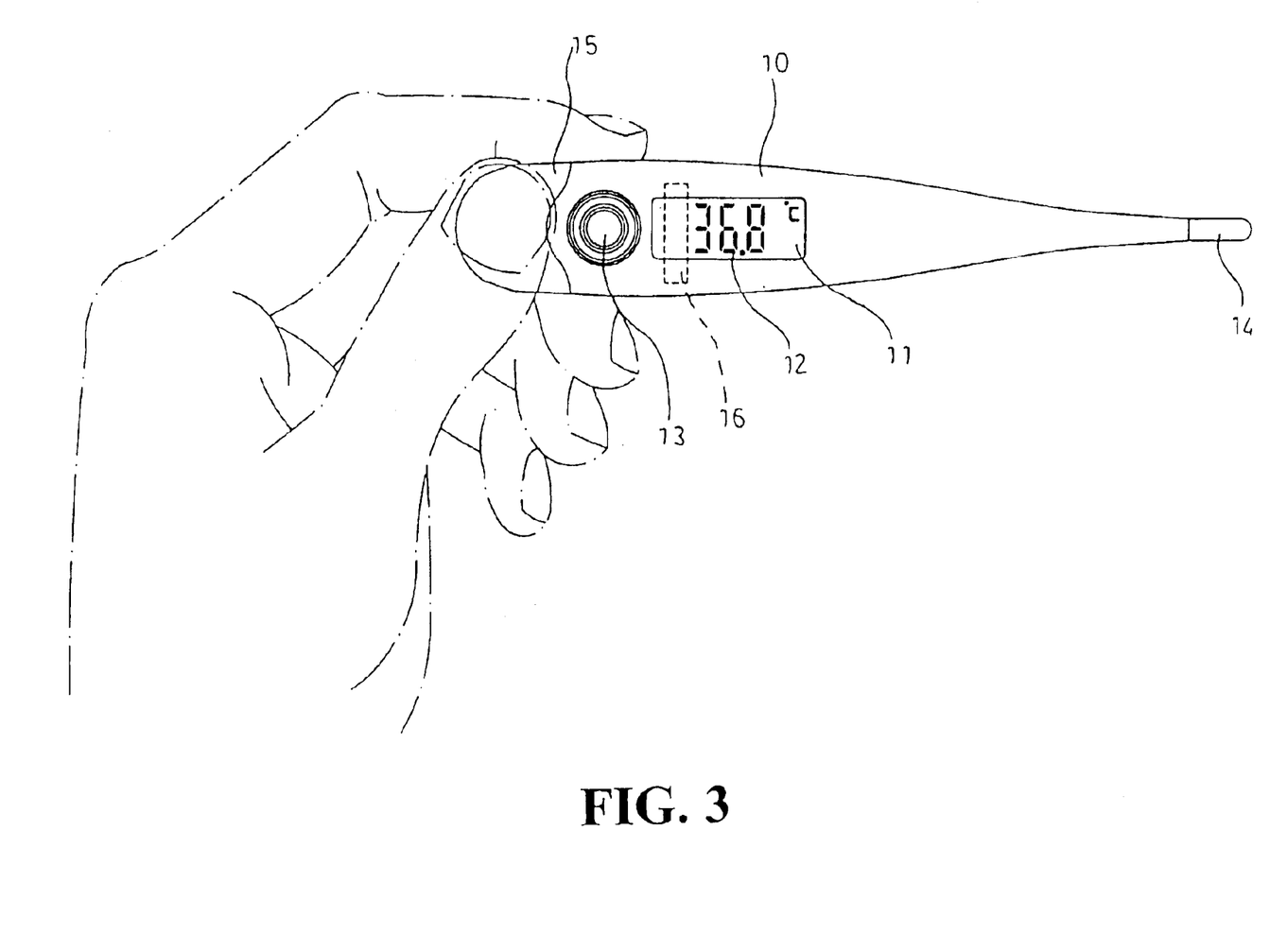
FIG. 3 is a schematic view showing the holding of the thermometer with the left hand.
Figure 4C:
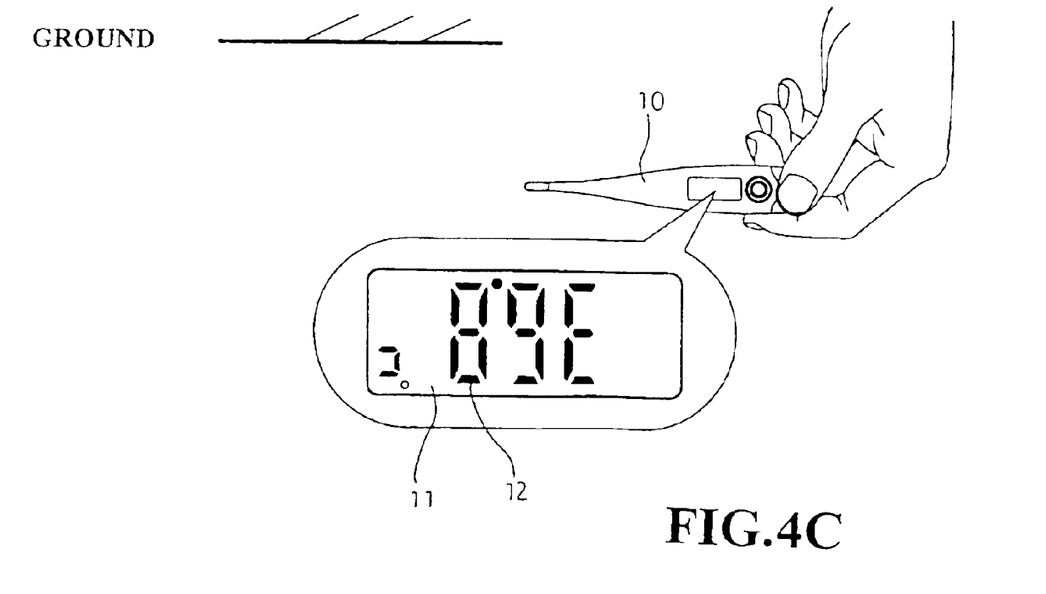
Figure 7:
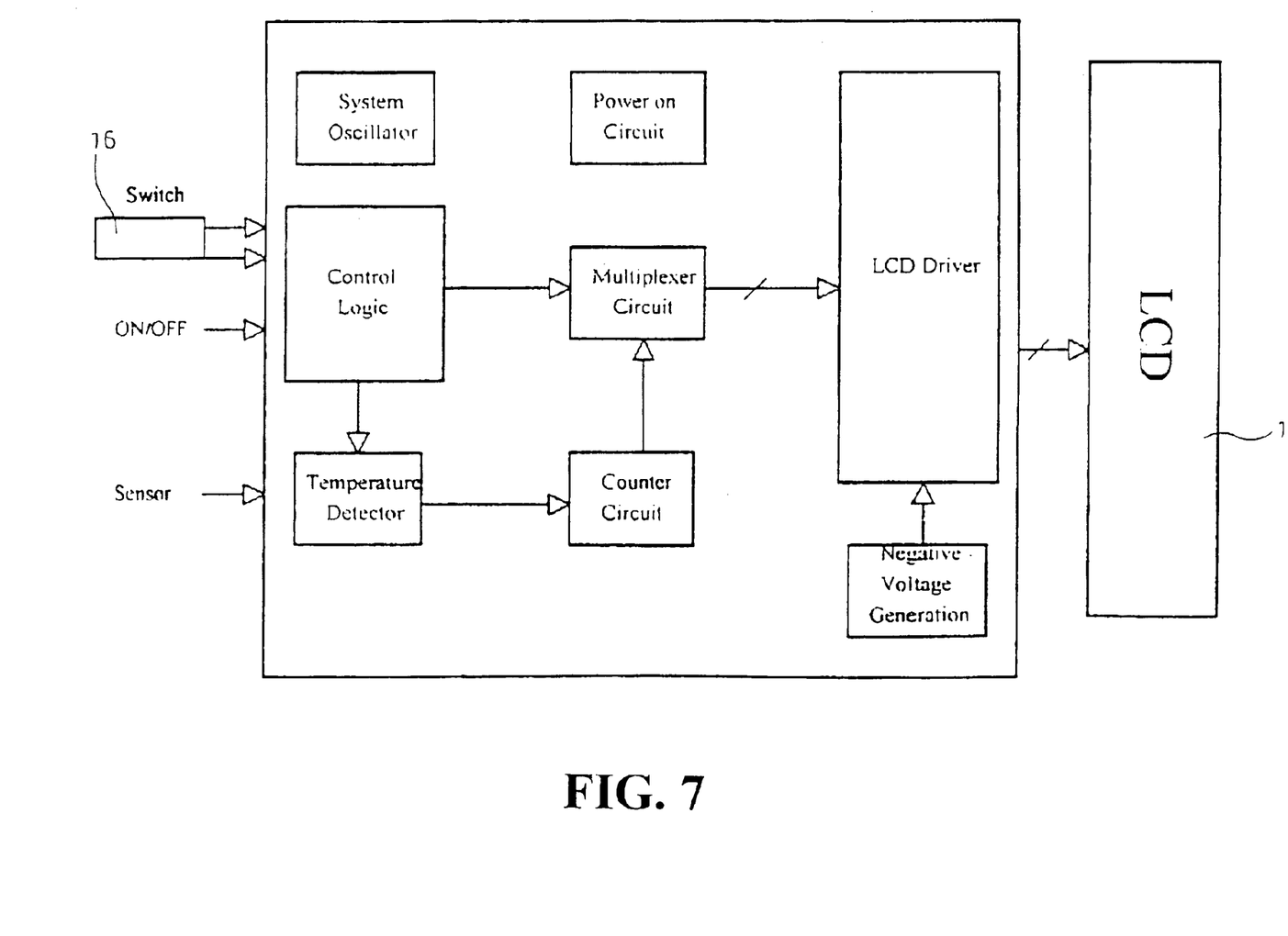
FIG. 7 is a circuit block diagram of the present invention.
Figure 8:
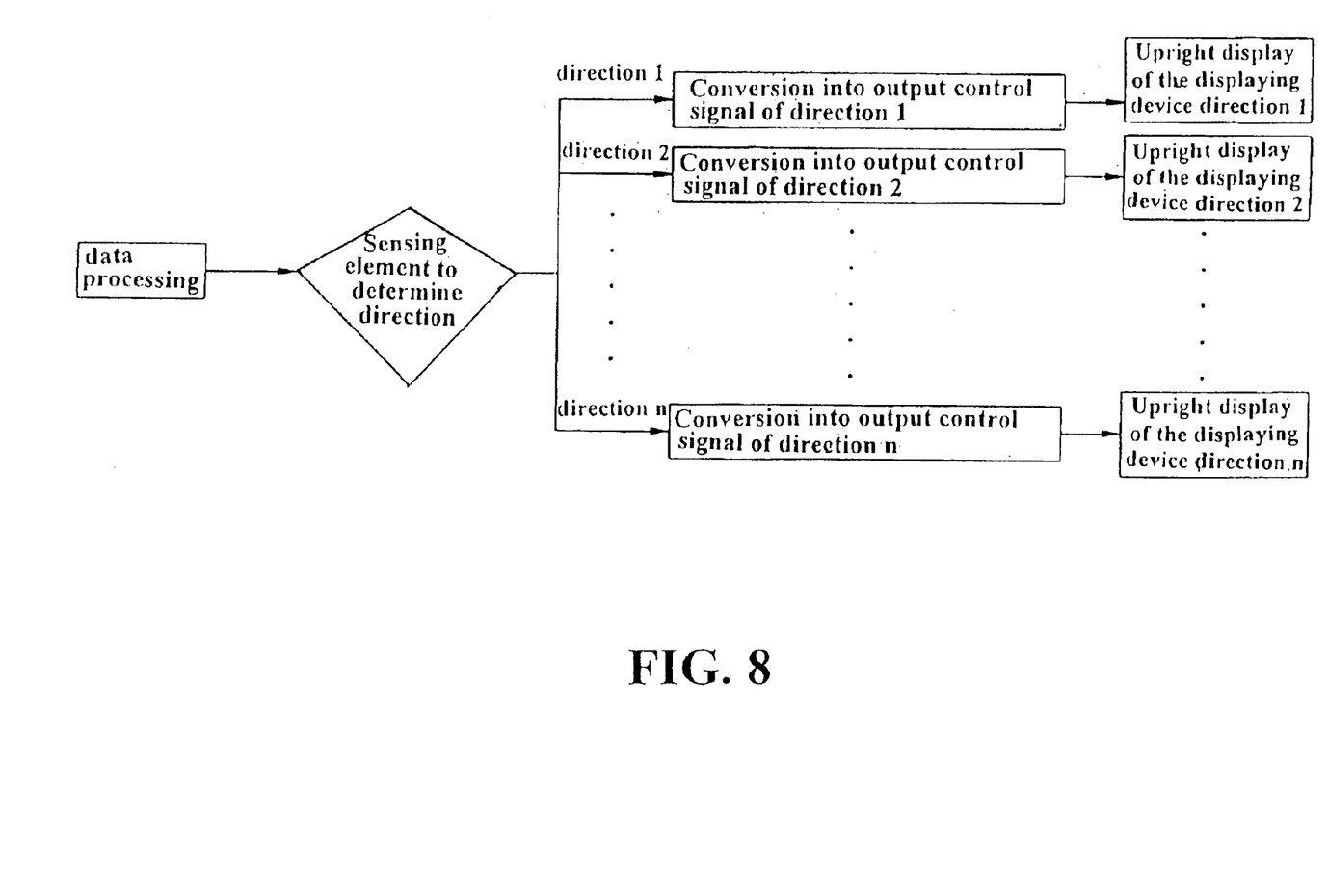
FIG. 8 is a sensing flowchart of an upright display of the display device of the present invention.

Referring to FIGS. 3 and 4C, when the thermometer is held by the left hand and disposed in an inverted position, the direction sensing element 16, due to the gravity, produces a signal such as direction 1, direction 2, direction 3, direction n (referring to FIGS. 7 and 8). Then the control circuit receives the signal and converts the signal into reverse output control signal. A driving circuit of the display 11 is used so that the display device 11 can display the identifiable signal capable of showing temperature reading in an upright manner with respect to the user. Thus, regardless of whether the thermometer is held by the left or the night hand, the signal 12 can be identified easily.

Figure 6:
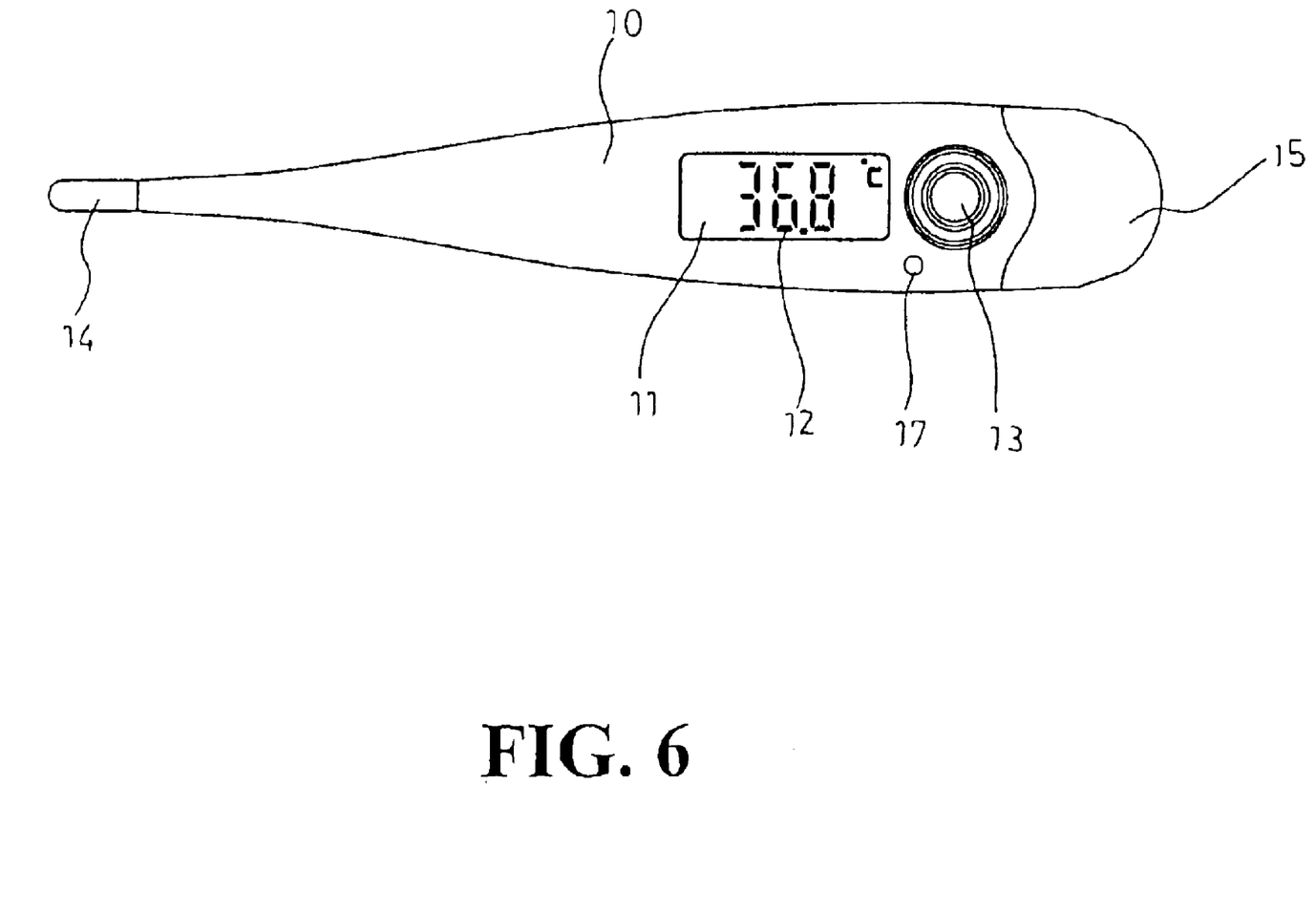
FIG. 6 is another preferred embodiment of the electronic thermometer of the present invention.
Figure 9:
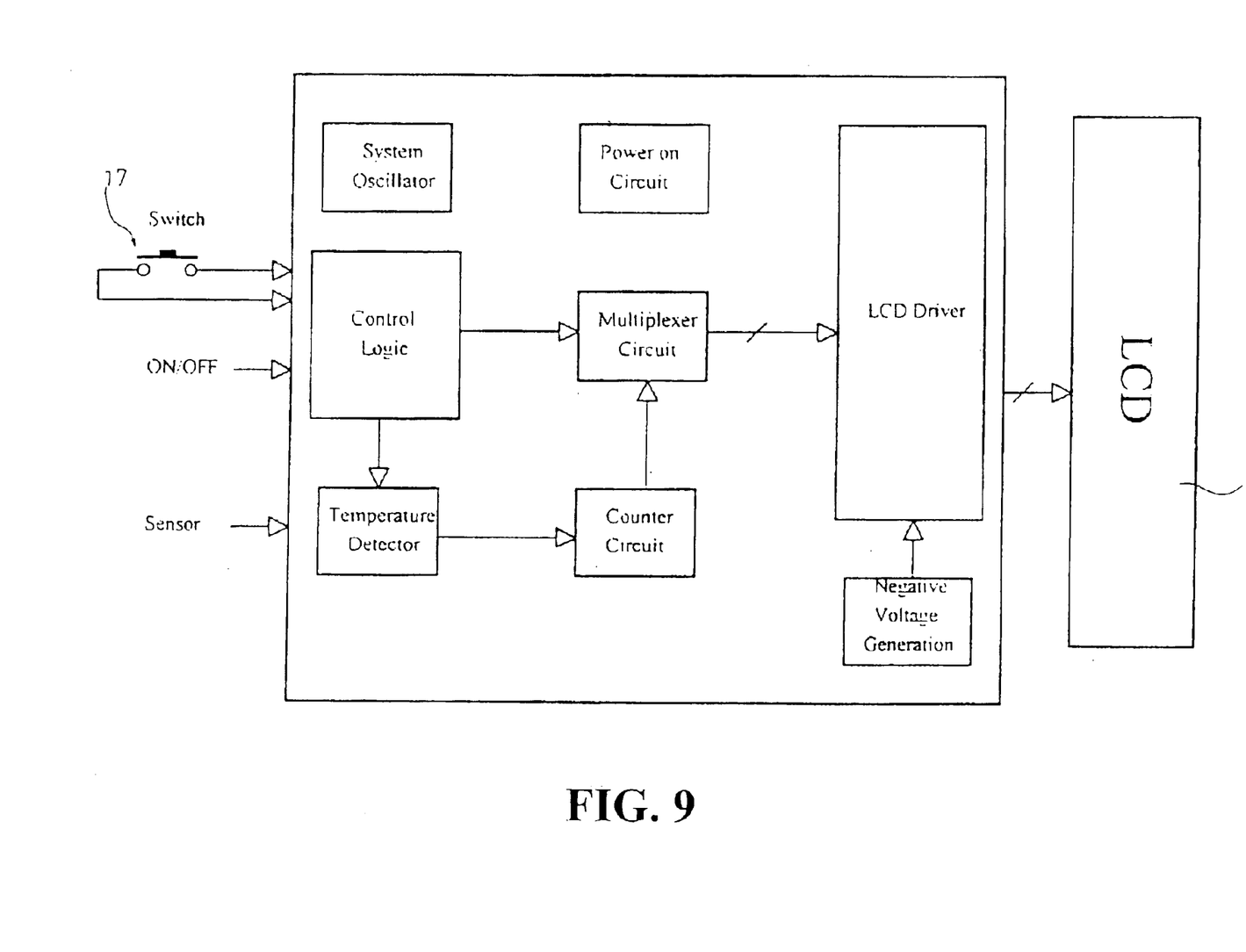
FIG. 9 is another circuit block diagram
Figure 10:
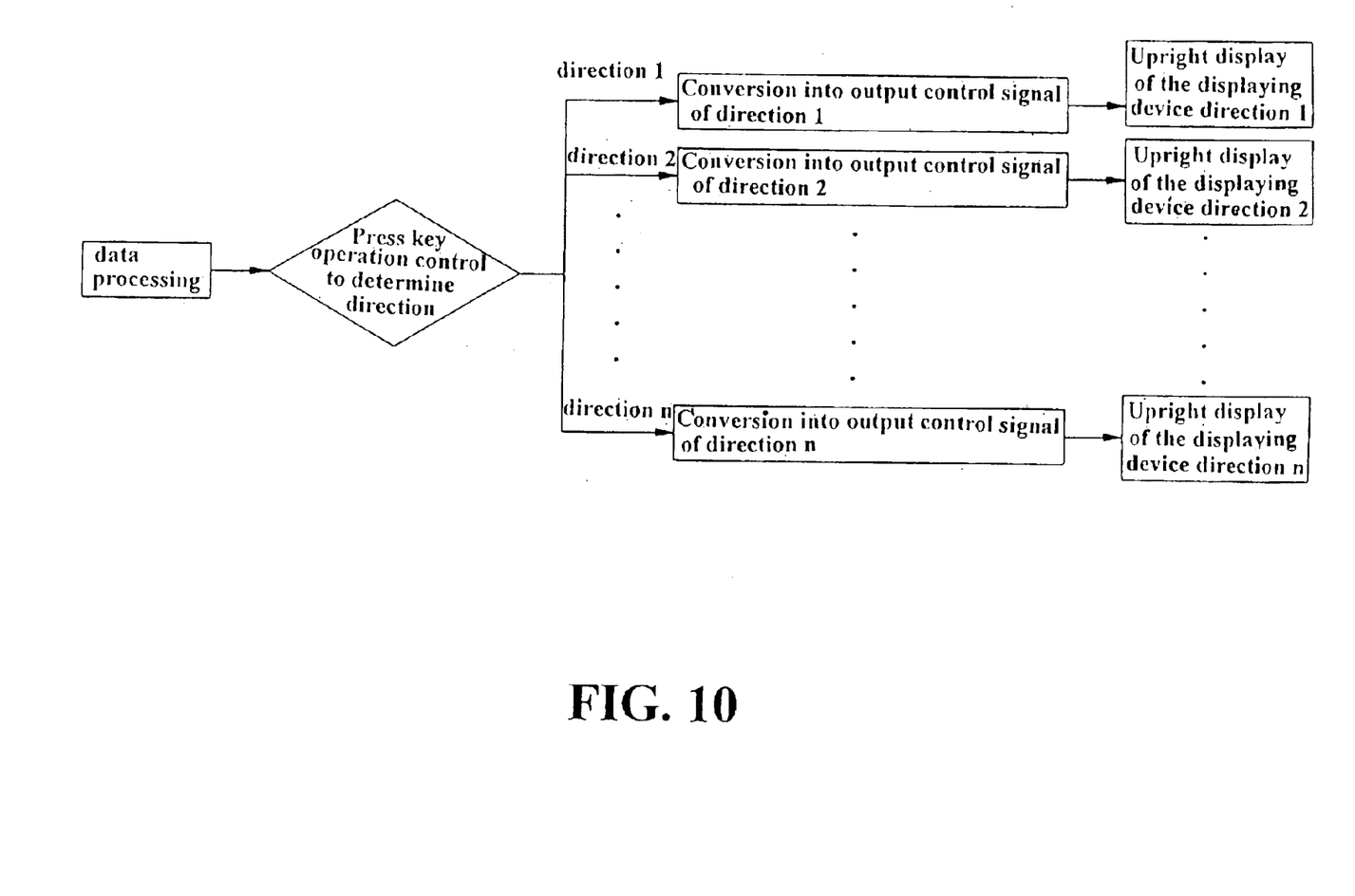
FIG. 10 is a sensing flowchart of the display device which can display the upright display.

Referring to FIG. 6, the body 10 of the thermometer may be provided with a keybutton 17 to replace the direction sensing element 16. The keybutton 17 is used for controlling purpose, for instance, if the key 17 is depressed a certain number of times and for a certain period of time or the combination thereof, a signal used by the thermometer, such as direction 1, direction 2, direction 3, direction n (referring to FIGS. 9 and 10), is generated. As the control circuit receives the signal, the signal will be converted into reverse output control signal. The driving circuit of the display 11 is used for showing the identifiable signal capable of displaying temperature reading in an upright manner with respect to the user. Thus, regardless of whether the thermometer is held by the left or the right hand, the signal 12 can be identified easily.

Figure 11A:
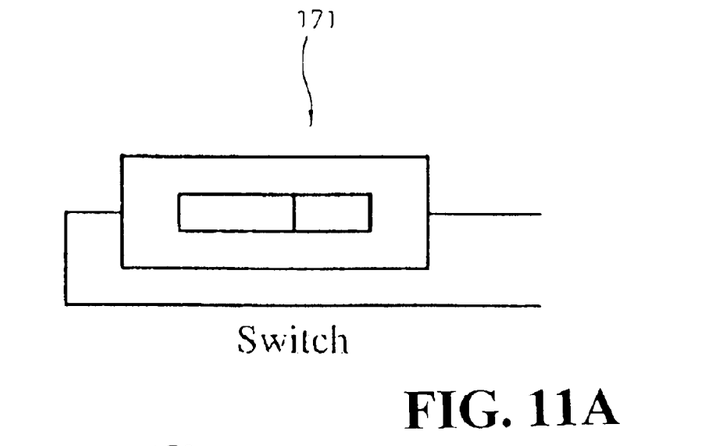
FIGS. 11A, 11B, 11C show the various sensing switches of the present invention.
Figure 11B:
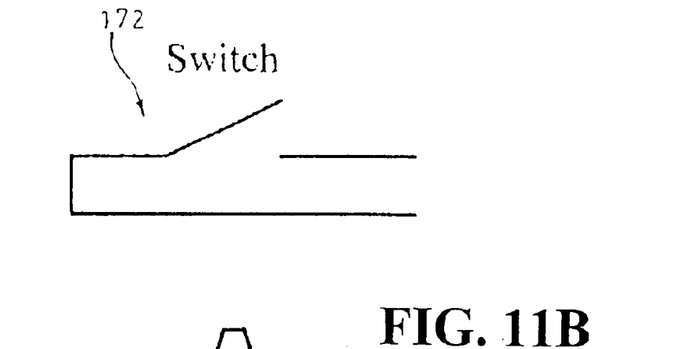
Figure 11C:
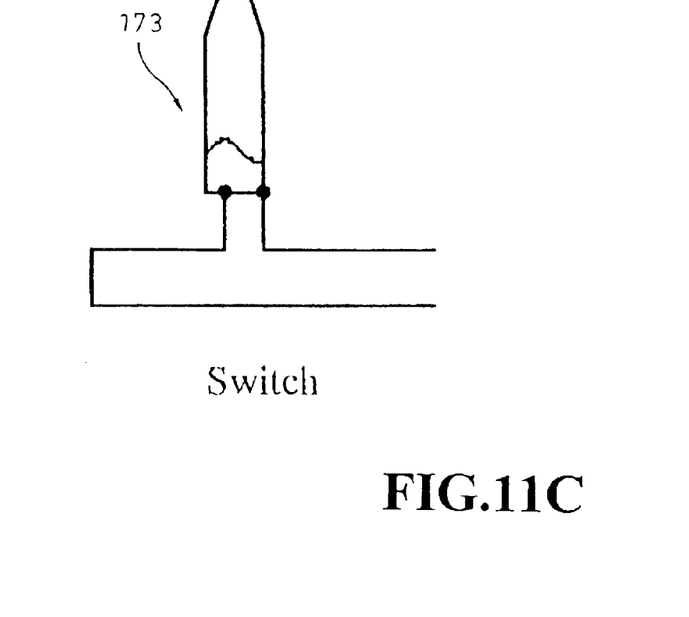

Referring to FIG. 11, the keybutton 17 may be replaced with a sliding switch 171, a single-throw switch 172, or a mercury switch 173 as required.

Figure 12:
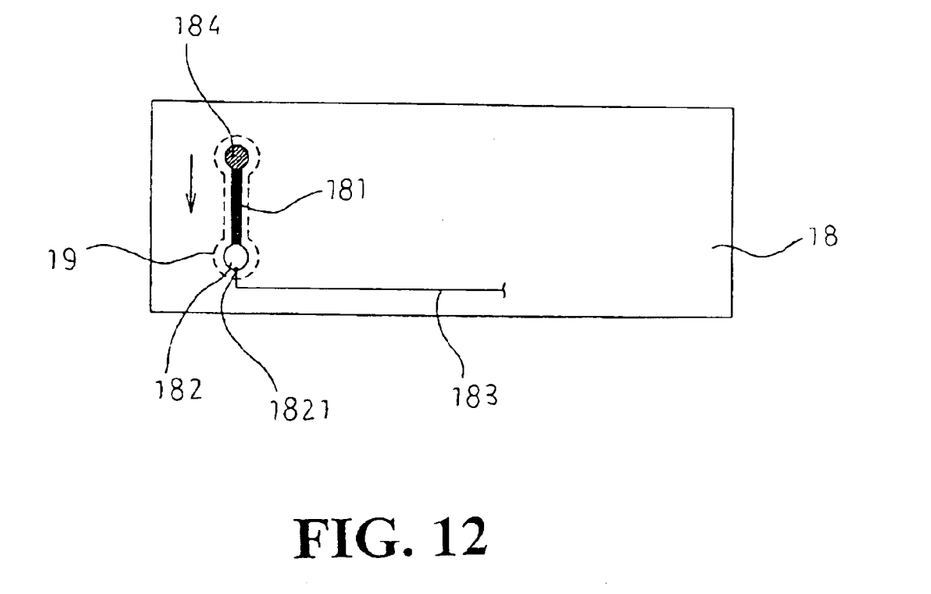
FIG. 12 is another preferred embodiment of the direction sensing element of the present invention.

If a roller (ball) vibration switch is used as the direction sensing element 16, the manufacturing will be much increased and so a number of other mechanisms are used for replacing the roller (ball) vibration switch. Referring to FIG. 12, the sensing element 16 may be replaced with a structure having a gold foil 181 on the circuit board 18 of the body 10. One end of the gold foil 181 makes use of the through hole 182 on the circuit board 18 to connect with a display circuit 183. On the gold foil 18, the top portion of the through hole 182 is provided with a fixed rail 19 (shown in dotted lines) such that a ball 184 can roll along the fixed rail 19. Under normal conditions, where the thermometer is not inverted, the ball 184 is positioned at one end of the gold foil 181 without the through hole 182. Thus, the through hole 182 is not conducted, and the display circuit 183 will not be in conduction too. When the thermometer 10 is inverted, due to the gravity, the ball 184 moves along the gold foil 181 to fall into the through hole 182. By means of the conductive material in the through hole 182, the display circuit 183 generates a direction signal.

Figure 13:
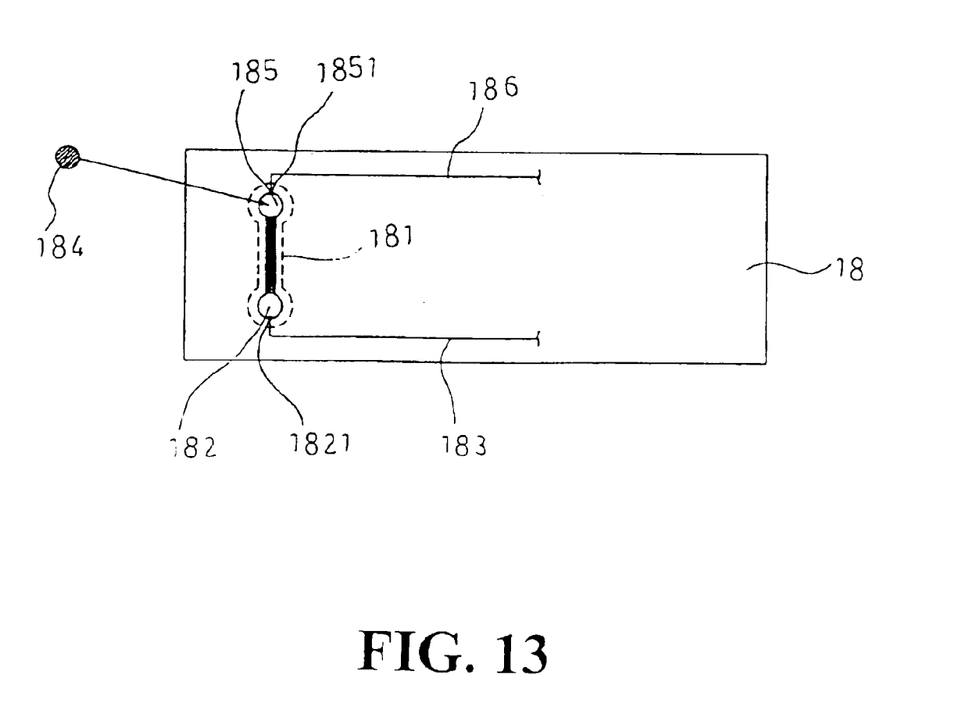
FIG. 13 is a further preferred embodiment of the direction sensing element of the present invention.

FIG. 13 illustrates another preferred embodiment of the direction sensing element 16. The upper section of the circuit board 18 is provided with a gold foil 181, and the two ends of the gold foil 181, by means of two through holes 182, 185, are respectively connected to two direction display circuits 183, 186 (representing two directions). On the gold foil 181, the top portion of the through hole 182 is provided with a fixed rail 19 (shown in dotted lines) such that the ball 184 can move along the rail 19. Under normal conditions, the body 10 is not inverted, the ball 184 is positioned at the through hole 185 and is in communication with one direction display circuit 186, but the ball 184 is not in communication with the other direction display circuit 183. When the thermometer 10 is inverted, due to the gravity, the ball 184 will move away from the through hole 185 and go along the gold foil 181 to the other through hole 182. At this instance, due to the fact that a conductive member is provided in the through hole 182, the other direction display circuit 183 will generate a direction signal.

The two through holes 182, 185 and the communication regions of the two display circuits 183, 186 can be soldered into raised contacts 1821, 1851 to enhance the sensitivity.

In view of the above, the electronic thermometer according to the present invention is provided with an identifiable signal which can identify characters and/or symbols in multiple directions, and a direction sensing element for providing an upright display of identifiable characters or readings regardless of whether the user uses the left hand or right hand to hold the thermometer.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. An electronic thermometer comprising a control circuit and a directionally adjustable LCD display, said display being provided with identifiable signals, wherein the thermometer is provided with a direction sensing element, said direction sensing element being a mechanism having a gold foil provided on a circuit board of the thermometer, a first end of said gold foil making use of a through hole on the circuit board to connect with a first display circuit, a top portion of said through hole being provided with a fixed rail to enable a ball to roll along the fixed rail, said ball being positioned at a second end of said gold foil when said thermometer is not inverted thereby causing said through hole and the display circuit not to be in conduction, but said ball will move along said fixed rail to fall into said through hole when said thermometer is inverted thereby causing said display circuit to generate a directional signal; whereby the thermometer, under normal operating direction, is an upright position facing the user, and if the thermometer is reversed, the direction sensing element due to gravity produces a directional signal and the control circuit of the thermometer receives the signal which immediately outputs to the display to produce an upright display signal to the user.

2. The electronic thermometer as claimed in claim 1, wherein said second end of said gold foil is provided with a second through hole connected to a second display circuit.

\* \* \* \* \*